United States Patent [19]
Dolza

[11] 3,969,905
[45] July 20, 1976

[54] METHOD AND APPARATUS FOR LAYING PIPELINES

[76] Inventor: Claudio Dolza, Strada del Nobile, 36-Turin, Italy

[22] Filed: Dec. 23, 1974

[21] Appl. No.: 535,672

[30] Foreign Application Priority Data
Jan. 22, 1974 Italy................................ 67169/74

[52] U.S. Cl.................................. 61/111; 61/72.7; 214/1 PA; 214/1 PB
[51] Int. Cl.²........................................ F16L 1/00
[58] Field of Search................. 61/72.1, 72.3, 72.6, 61/72.5, 72.7; 214/1 PA, 1 PZ

[56] References Cited
UNITED STATES PATENTS

| | | | |
|---|---|---|---|
| 1,844,385 | 2/1932 | Goldsmith | 214/1 PA |
| 2,538,365 | 1/1951 | Jones | 214/1 PA X |
| 3,605,419 | 9/1971 | Wells | 61/72.5 |
| 3,686,888 | 8/1972 | Helton | 61/72.1 |
| 3,710,583 | 1/1973 | Blackwell | 61/72.5 |
| 3,744,259 | 7/1973 | Wagley | 61/72.5 |

FOREIGN PATENTS OR APPLICATIONS

| | | | |
|---|---|---|---|
| 862,220 | 11/1940 | France | 61/72.6 |

OTHER PUBLICATIONS
Brown & Root Pipelay Barge, M-211.

*Primary Examiner*—Jacob Shapiro
*Attorney, Agent, or Firm*—Flynn & Frishauf

[57] ABSTRACT

Method and apparatus for laying pipelines wherein a number of operating trolleys running on the bottom of an excavation are powered from service vehicles running on a service path to the side of the excavation to enable said operating trolleys to position and connect additional pipeline lengths before advancing to deposit the completed pipeline on the excavation bottom.

11 Claims, 10 Drawing Figures

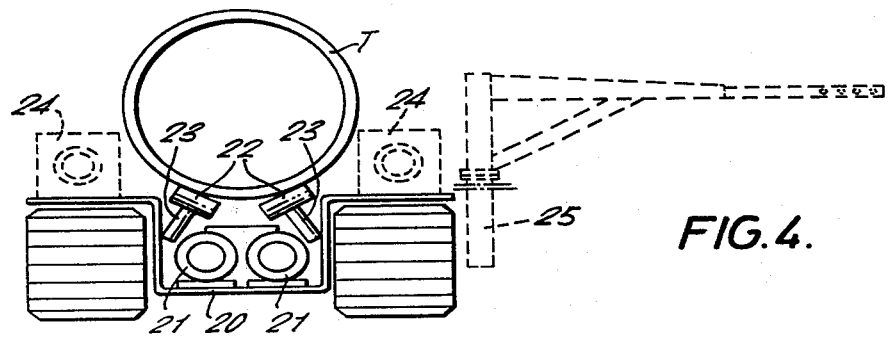
FIG. 4.
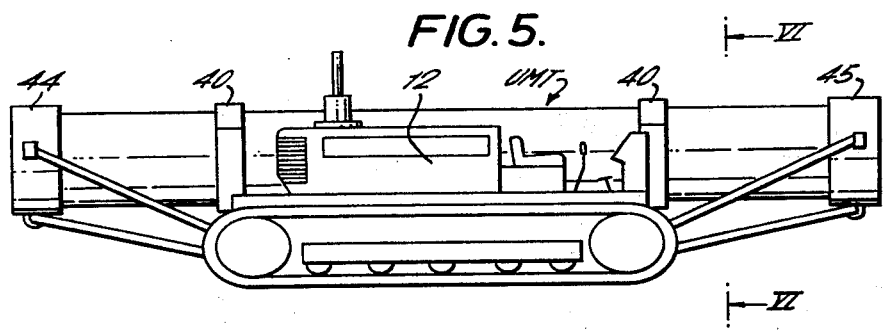
FIG. 5.
FIG. 6.
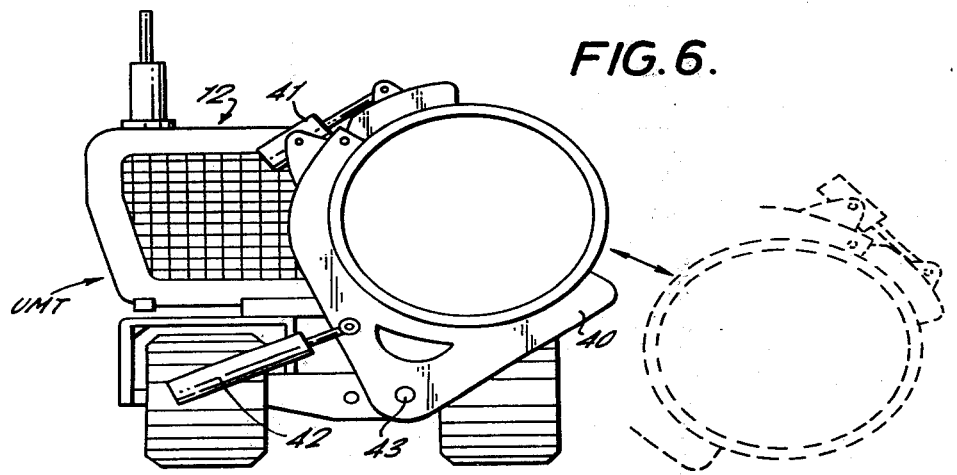

METHOD AND APPARATUS FOR LAYING PIPELINES

FIELD OF THE INVENTION

The present invention relates to a method and apparatus for laying fluid pipelines, especially oil pipelines, gas pipelines and the like.

Said pipelines consist of a pipe of large diameter, obtained by welding pipe lengths together, the pipe being coated with a protective sheath and laid into an excavation.

PRIOR ART

At present, all operations relating to welding, controlling and sheathing are carried out on a service path at the side of the excavation, whereon operating machines are travelling to and fro.

The pipe lengths are transported to the site on said service path and connected one after another with the pipeline already formed, the end of which is held outside the excavation on the service path. A completed pipe length is then grasped by lifting means travelling on the service path and laid into the excavation. The operation is made possible due to the flexibility of the pipeline, and by curving the pipeline with a large radius in order to avoid permanent deformation thereof and the creation of excessive stresses, capable of endangering the integrity of the pipeline.

The maximum curvature that the pipeline can assume without risk of damage depends on the pipe diameter. With increasing use of large diameter pipes ranging between 60-80 cm, only very limited curvature is possible, so that the pipeline length to be left outside the excavation is rather long. This makes difficult the laying of the pipeline into the excavation, especially taking into account the weight of pipe involved. In the case of pipelines of large diameter, for instance of 120 cm and more, as is at present preferred when laying oil pipelines, the described inconveniences make practically impossible both the carrying out of the construction beside the excavation and the laying of the pipeline as well. In fact such a method would require lifting machinery of unacceptable dimensions, taking into account that said machinery, which is required to travel to and fro on the same path alongside the excavation, must bear the whole weight of the pipeline to one side by means of projecting booms, thus necessitating the use of counterweights. On the other hand, using in itself fixed equipment, for instance cranes guided on rails, gives rise to many inconveniences, first of all high installation costs, and then considerable difficulties in working, due to the fact that the equipment must advance at the same time as each additional pipeline length is laid into the excavation.

Brief Description of the Invention

The present invention avoids the inconveniences of the known method by providing a method consisting in forming the pipeline directly on the excavation axis by juxtaposing additional pipe lengths by means of operating trolleys travelling on the excavation bottom, furthermore having the function of supporting the end of the already complete pipeline, said operating trolleys being driven by corresponding service vehicles travelling outside on the service path provided laterally of the excavation.

The operating trolleys consist of self-propelled tracked trolleys, provided with hydraulic traction means, the corresponding service vehicle also consisting in tracked trolleys, each carrying a corresponding motorized pump set for feeding the corresponding operating trolley with pressurized hydraulic fluid. Each operating trolley is on its turn provided with power equipment to carry out corresponding operations on the pipeline being formed. More particularly, these operating trolleys may include a trolley provided with generators for electro-welding operations by means of electrodes carried by movable arms, a trolley equipped with instruments for checking each welded seam, a trolley carrying a machine for sheathing the pipeline and a trolley for laying machines, the last-mentioned trolley being equipped with excavation means for scavenging the excavation bottom before laying the completed pipeline therein.

FURTHER FEATURES OF THE INVENTION

In order to efficiently carry out the method according to the invention, the operating trolleys are positioned in the excavation as follows, starting at the pipeline end being formed.

At least two operating trolleys, respectively placed ahead of and to the rear of the pipe connection being carried out; one trolley for checking the welded seams; one trolley for sheathing the pipe; and one first and one second pipe laying trolley, the second one being equipped with scavenging means for clearing the excavation bottom, preferably of the bucket elevator type.

Each one of the trolleys aforesaid acts also as movable supports for supporting the pipeline and to this aim it is provided with supporting rollers permitting both extraction and laying of the pipeline while the operating trolleys advance supporting the pipeline being formed.

The additional pipe lengths to be connected with the pipeline are fed from the service path sideways into the excavation, by means of an expressly equipped service vehicle, the vehicle in question being provided at its sides with movable grippers for lifting, grasping and laying the pipe. The vehicle is advantageously provided at its ends with spindle heads to form a butt chamfer on the additional pipe lengths prior to the next welding operation. The conveying service vehicle operates in conjunction with a chute, the latter having retaining slides adapted to lower the pipe length into the excavation on to the roller supports of the operating trolleys.

BRIEF DESCRIPTION OF DRAWINGS

Further features of the invention will appear from the following detailed specification, with reference to the accompanying drawings given by way of non-limitative examples, in which:

FIG. 4 is a front elevation of an operating trolley, according to its most simple version, its function being that of supporting the pipeline;

FIG. 5 is a side elevation, showing the service vehicle for transporting the pipes and chamfering the pipe ends;

FIG. 6 is a schematic section on line VI—VI of FIG. 5;

DESCRIPTION OF EMBODIMENTS

Figure 1:
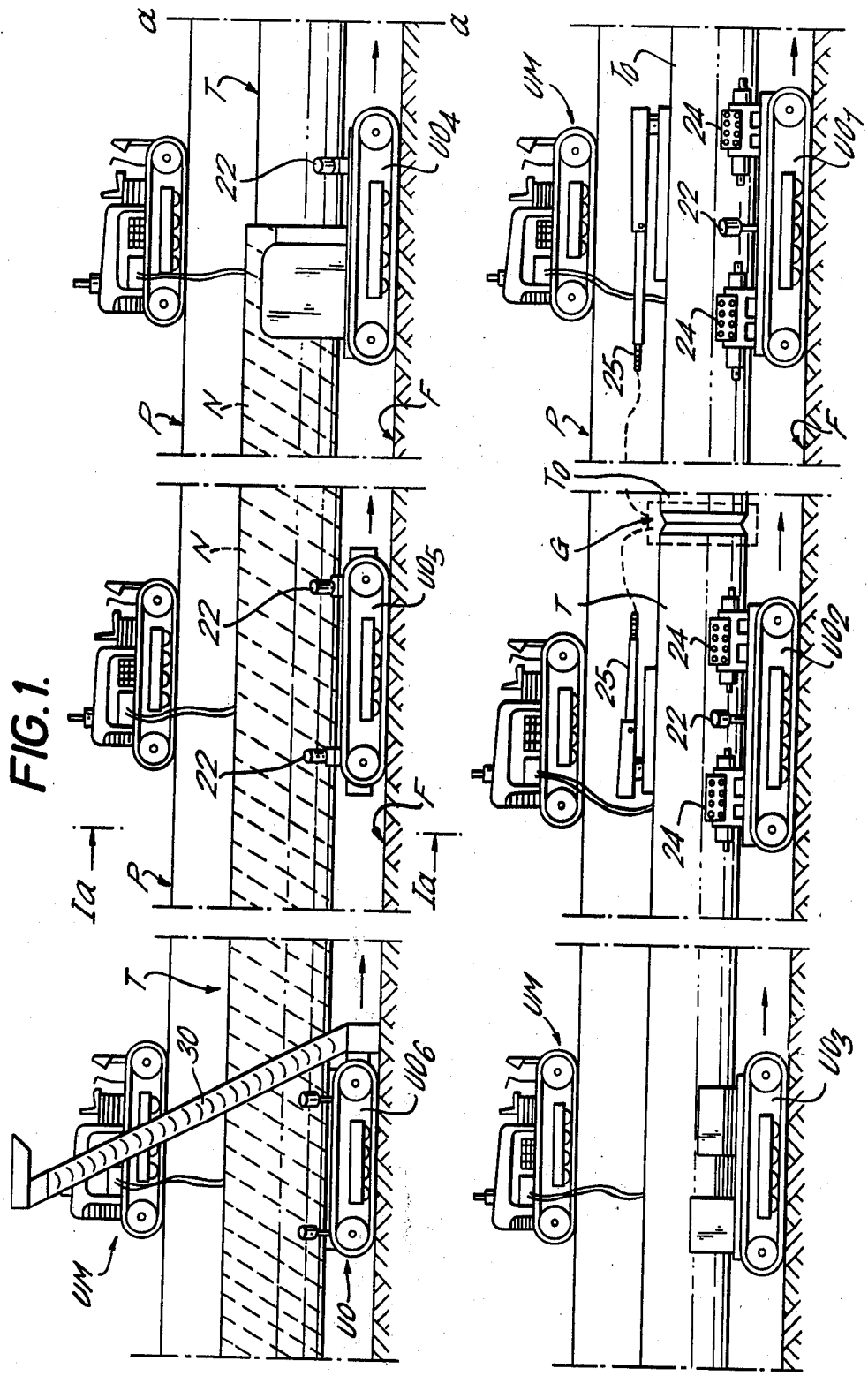
FIG. 1 is a schematic sectional view on the excavation axis, showing the succession of operations carried out to effect formation and laying of the pipeline.
Figure 1A:
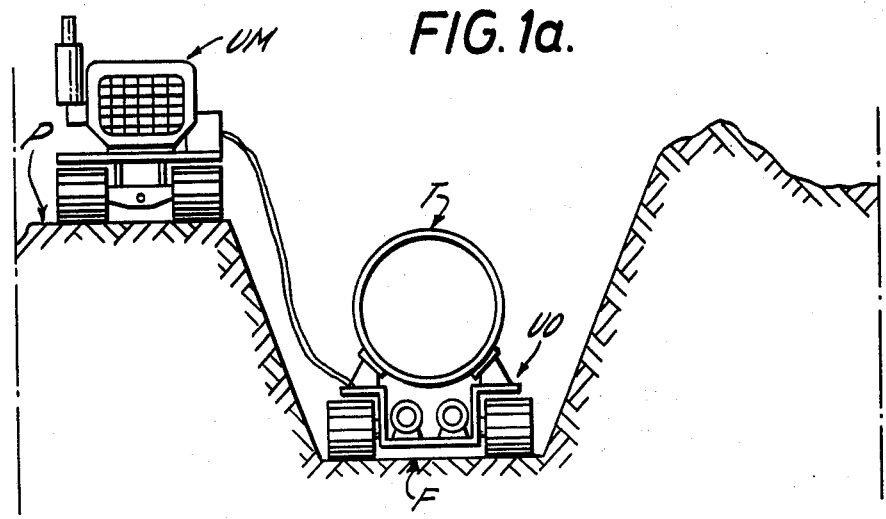
FIG. 1a is a schematic section on the line $I_a$—$I_a$ of FIG. 1.

In the drawings, F shows the excavation bottom and T the pipeline being formed. As appears from FIG. 1a, the excavation is of trapezoidal section, provided at at least one side with a service path P. The pipeline is formed by successively connecting pipe lengths together, head-against-head, by means of circumferentially continuous bead welds. The work schedule comprises checking operations concerning the bead welds, as well as a continual taping for sheathing the pipeline with a protective material. According to the invention, all operations pertaining to the work schedule are carried out on the excavation axis. To this end the pipeline is formed by successively introducing the additional pipe lengths into the excavation and connecting each of them with the completed pipeline end.

The method in question is carried out using operating trolleys generically indicated by UO, travelling to and fro in the excavation, having also the function of movable supports for the pipeline end. Together with the operating trolleys cooperate service vehicles UM, traversing on the service path P. The driving units consist essentially in power generators, connected with the operating trolleys, with the aim of providing the trolleys with the necessary power required for their traversing, as well as for the operations or a part of the operations being carried out by the operating trolleys on the pipeline being formed.

The service vehicles are advantageously provided with a motorized pump set, feeding the operating trolleys with pressurized hydraulic fluid, the operating units trolleys provided with hydraulic motors for their movement, as well as with operative auxiliary equipment.

Figure 2:
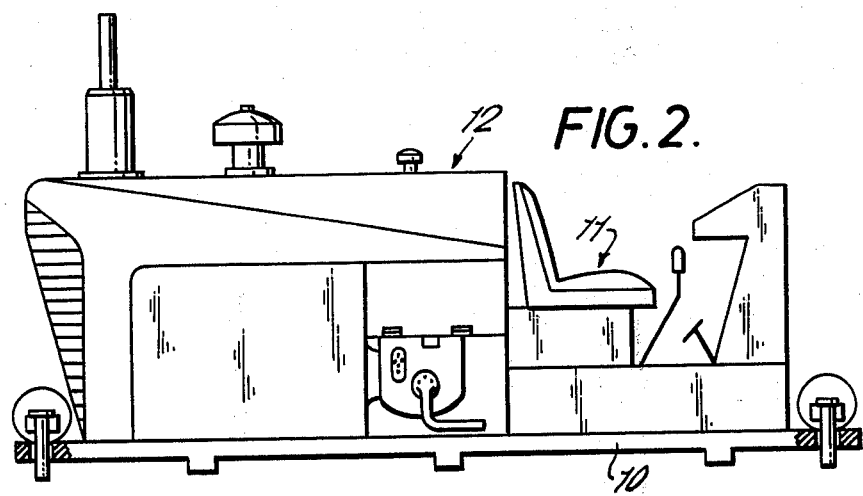
FIG. 2 is a schematic elevation of a service vehicle.
Figure 3:
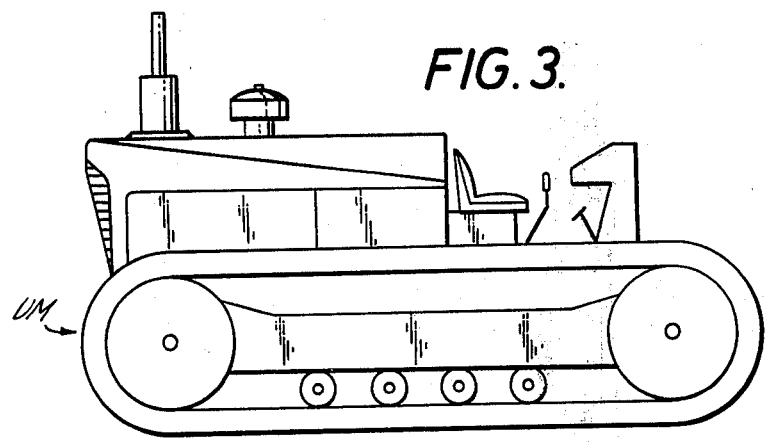
FIG. 3 shows said service vehicle installed on a self-propelled tracked chassis.

With reference to FIG. 2, each service vehicle comprises a frame 10 and a driving seat 11, a unit consisting in a thermic motor and a hydraulic pump, as referred to by 12, as well as means for controlling the delivery of the pressurized fluid. The frame is installed on a tracked chassis which is self-propelled (see FIG. 3). The chassis is provided with hydrostatic traction means. The above said frame 10 can be mounted on the longitudinal center of the tracks, or laterally in the case that the service vehicle is also used for transporting pipe lengths, as shown in FIGS. 5 and 6.

FIG. 4 is a front view of an operating trolley. It consists of a tracked chassis, including a frame 20 provided with hydraulic traction motors 21, fed by a corresponding driving unit. The vehicle is provided with rollers 22 acting as a saddle for supporting, guiding and holding a pipeline length T; said rollers 22 being advantageously supported by the ends of the stems on the pistons of hydraulic jacks 23.

According to the kind of work to be carried out, the operating trolleys are provided with the appropriate equipment. Accordingly, as an instance, FIG. 4 shows equipment consisting of electro-welders 24 and boom 25 for supporting the welding pliers. Further equipment may consist of a sheathing machine as well as of conventional equipment for checking the welded beads.

Referring again to FIG. 1, a diagram concerning the optional employment of the operating trolleys according to the invention will now be described. Starting from the free end of the pipeline, on the right-hand side of the drawing, it can be seen that a pipe length $T_0$ is approached, inside the excavation, to the pipeline end, supported by an operating unit $UO_1$, equipped with electro-welders 24. To the rear of the joining section G a second operating unit $UO_2$ is placed, also equipped with electro-welders. The aforesaid trolleys are advantageously provided with four electro-welders, so that eight bead welds can be made according to a conventional method. The operating trolley $UO_2$ has also the aim of supporting the pipeline end and, due to the presence of the supporting rollers 22 and of the jacks 23 cooperating therewith, it can move forwards under the pipeline, varying both the height and inclination of the same, in order to exactly line up both pipe ends at the connecting section G.

Proceeding along the pipeline to the left, with reference to the drawing, to the rear of the operating trolley $UO_2$, further operating trolleys $UO_3$ and $UO_4$ are arranged in order, one of them being provided with instruments for checking the welded seams, the other being provided with equipment for sheathing the pipeline with protection taping N.

Further operating trolleys follow, respectively $UO_5$ and $UO_6$, hereafter termed "pipelayers", having the function of supporting the pipeline and facilitating its laying down into the excavation, according to a progressively decreasing inclination. The last unit $UO_6$ is provided with a device 30, of the scoop elevator type, for removing rubble out of the excavation bottom, before laying the pipeline thereon.

Accordingly, the pipeline is progressively formed by joining on to its end additional lengths such as $T_0 - T_1$ etc. and correspondingly advance the operating trolleys $U_0$ along the excavation bottom.

For transporting the additional pipe lengths to the site, a service vehicle UMT is employed, purposely equipped to that object. FIGS. 5 and 6 are schematic, detailed views of the structure of said service vehicle, consisting in a self-propelled tracked frame operated by a hydrostatic transmission and carrying a pump-generator set 12 on one side. At the opposite side a pair of grippers 40 are provided for grasping each additional pipe length. Together with said grippers cooperates an opening jack 41 and a tilting jack 42. The latter, by tilting the grippers around a fulcrum 43, permits grasping of the pipe length and the laying down thereof, the length having been transported in a lifted position at the side of the motor pump 12. The ends of the pipe length are machined while they are in said lifted position, in particular they are chamfered to facilitate connecting them together with welded seams. Accordingly, the vehicle is equipped with spindle heads 44–45, hydraulically operated by the motor pump 12. The spindle heads are engaged with the respective ends of the pipe length, so that the chamfering operation can be carried out during transport. Accordingly, the additional pipe lengths are unloaded at the site, ready for their immediate assembling. The transport service vehicle travels on the service path P, along the excavation and will be stopped in correspondence with the completed pipeline end. For laying each length into the excavation, a chute 50 is advantageously employed (FIG. 7), the end of which can be hooked at one side onto an operating trolley $UO_6$, stationed on the excavation bottom. The chute 50 is provided with slides 51 which are hydraulically operated for guiding and holding each pipe length so that, as soon as released by the grippers 40, it is lowered on to the above-said stationary operating trolley. The latter may consist in a carriage, as shown in the drawing but preferably forms an operating unit equipped with electrowelding sets, in order to execute the connection of the additional pipe lengths to the completed pipeline end.

Figure 7:
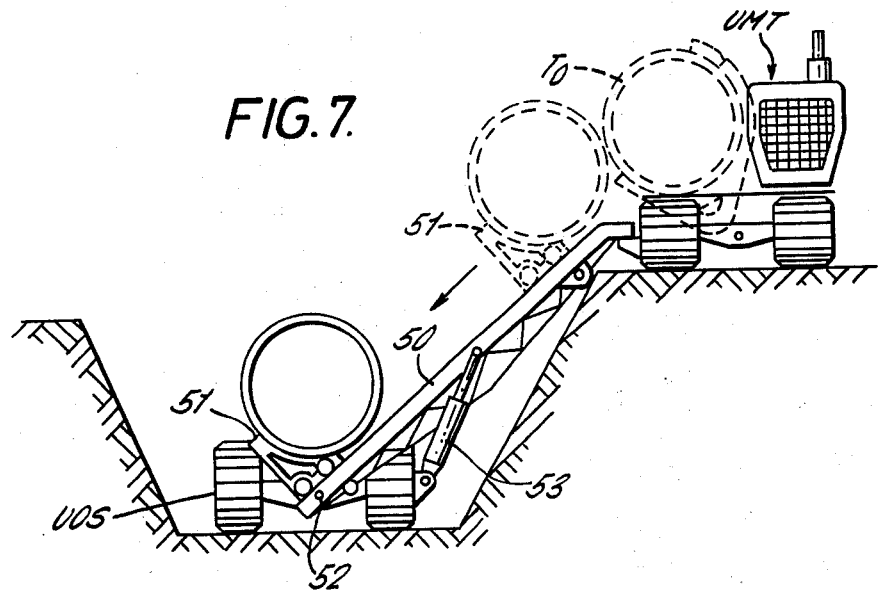
FIG. 7 is a cross-section of the excavation, showing a transporting service vehicle as well as the chute and the slide cooperating therewith, illustrated in the phase of unloading a pipe length to be connected with the pipeline end.

It is also possible directly to articulate, by means of a pivot 52, the chute 50 on to the operating trolley, the operating trolley then assuming the function of a carriage for unloading several additional lengths. FIG. 7 shows such a modification, the carriage with the chute aforesaid being referred to by UOS. A jack 53 is provided for producing oscillation of the chute and bringing the free end thereof into contact with the transport vehicle UMT.

Figure 8A:
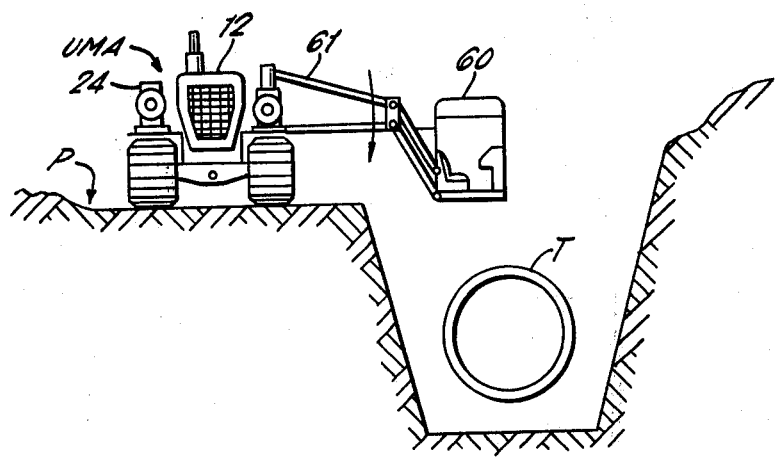
FIGS. 8 and 8a are respectively a plan view and a front elevation of a service vehicle, provided with auxiliary equipment for carrying out operations as well as checking along the pipeline, although keeping outside the excavation.
Figure 8:
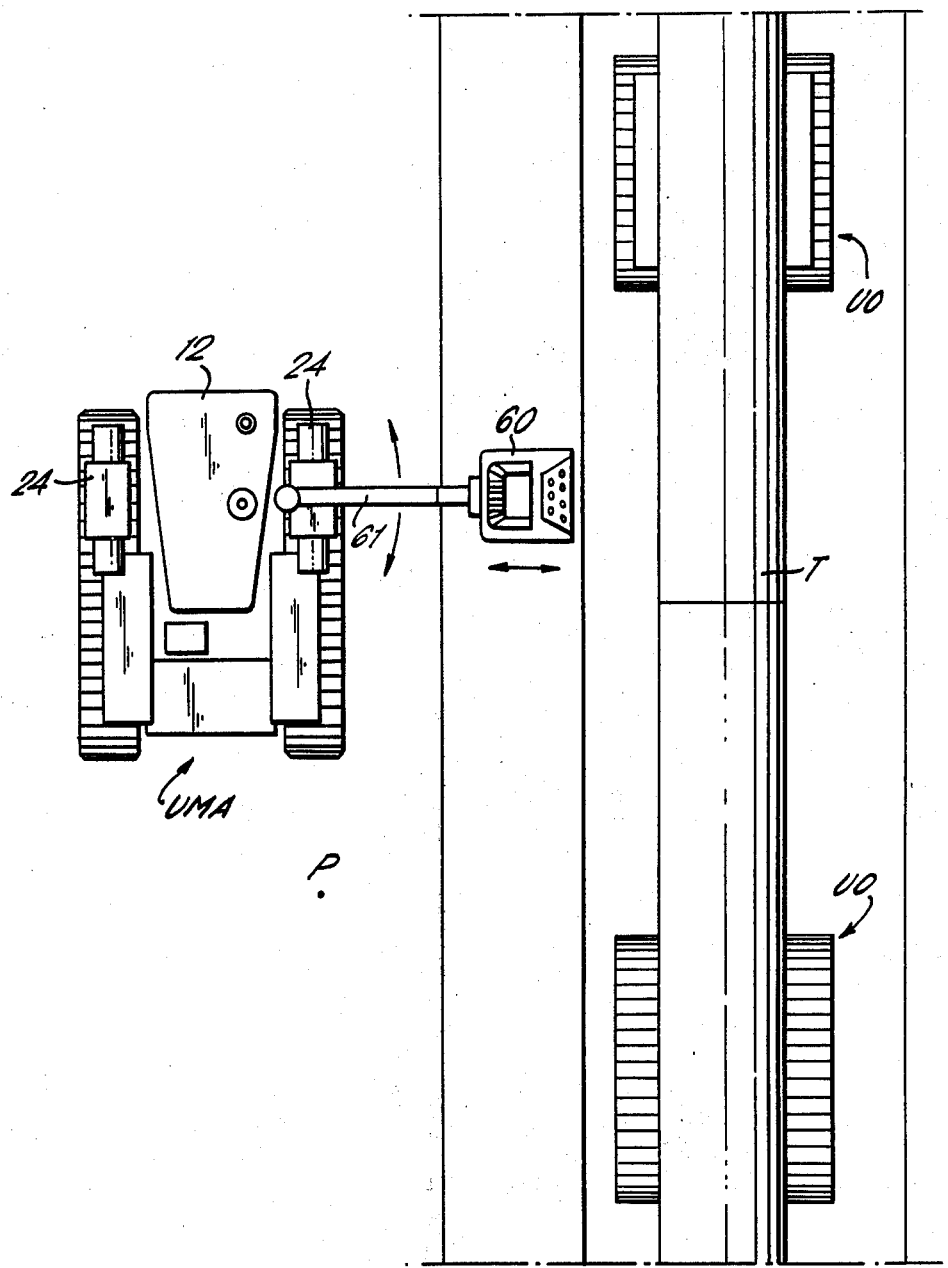

The machinery as described above is completed by auxiliary service vehicles UMA, as shown in FIGS. 8 and 8a. The vehicles in question are intended to travel to and fro on the side service path P, and are purposely equipped with a work cabin 60 supported by the end of an articulated arm 61, subjected to the action of controlling hydraulic jacks so as to be able to make universal displacements in the vertical as well as in the lateral directions. The work cabin is provided with control levers for carrying out the aforesaid displacements, as desired.

The auxiliary service vehicles will be used for corresponding inspection and/or finishing operations; for instance, auxiliary welding operations by means of electrowelding sets 24, permitting aso checking of the automatic operations as carried out by the operating trolleys on the excavation bottom, in a position of absolute safety for the operator.

From the above description it will be clear that the method and apparatus according to the invention, besides permitting (on account of the minimal bending to which the pipeline is subjected) ready laying of pipelines of big diameter, also permit the operations in question to be carried out in conditions of absolute safety, the presence of workers in the excavation being excluded, each operating trolley being remote-controlled by the operator from the corresponding service vehicle stationed on the service path beside the excavation. Furthermore, since the operating trolleys are not equipped with thermic engines or the like, their operations inside the excavation are possible under extreme conditions, especially in the presence of water, sand and the like, this making it possible greatly to simplify the preparation of the excavation by reducing the preventive tamping, drainage and reinforcement operations, with a noticeable reduction in costs.

It will be understood that the principles of the invention, the performance details and the ways of carrying out the invention can widely vary in relation to the above description and the accompanying drawings, which are given by way of non-limitative example, without departing from the scope of the invention as defined in the appended claims.

I claim:
1. A method of laying large diameter pipelines, especially oil pipelines of, for example, one to two meters in diameter, comprising the steps of:
    preparing an elongated excavation to receive a pipeline along the axis thereof;
    supporting the end of an already completed length of pipeline on at least one operating trolley movable along the bottom of the excavation in which the pipeline is being laid;
    lowering an additional length of pipeline into the excavation on to at least one further operating trolley movable along the excavation bottom ahead of the already completed pipeline;
    positioning the end of the additional pipeline length in juxtaposition with the end of the already completed pipeline by use of the operating trolleys and utilizing welding equipment carried by the operating trolleys to weld the additional pipeline length to the already completed pipeline while the pipelines are in the excavation;
    supplying power to the operating trolleys for movement thereof and for operating the welding equipment thereon from service vehicles movable along a service path outside of and to the side of the excavation; and
    advancing the operating trolleys along the bottom of the excavation after connection of the additional pipeline length has been completed, so that said at least one operating trolley lays a further portion of completed pipeline on to the bottom of the excavation and said at least one further operating trolley is advanced ahead of the completed pipeline ready to receive a further pipeline length to be connected and laid on the bottom of the excavation.

2. A method according to claim 1, comprising positioning the operating trolleys in sequence to perform the following operations in succession:
    welding the additional pipe length;
    checking the welded seam;
    sheathing an additional connected length of pipeline; and
    laying the completed pipeline on to the excavation bottom.

3. A method according to claim 1, comprising carrying the additional pipeline length and lowering said pipeline length into the excavation by means of a service vehicle located outside of the excavation.

4. A method according to claim 1, comprising chamfering the ends of the additional pipeline length prior to connection to the already completed pipeline, the chamfering operation being carried out during transport of the additional pipeline length to the excavation.

5. A method according to claim 1, comprising scavenging and cleaning the excavation prior to the operation of laying the pipeline on to the excavation bottom, the scavenging and cleaning operations being carried out by the last operating trolley.

6. Apparatus for laying pipelines in an excavation, especially large diameter oil pipelines of, for example, one to two meters in diameter, comprising:
    a plurality of operating trolley located inside the excavation, each trolley including:
    a tracked chassis for running on the bottom of an excavation in which the pipeline is being laid;

hydraulic motors in the chassis for driving the chassis track;

power equipment on the chassis for performing operations on the pipeline being laid, at least one of said trolleys carrying welding equipment for welding sections of pipeline together;

means on the chassis for adjustably supporting a length of pipeline; and an hydraulic fluid supply line leading from the chassis to enable the motors, power equipment and adjustable supporting means to be supplied with power; and at least one service vehicle outside the excavation and to the side of the excavation coupled to the hydraulic fluid supply line of at least two of said trolleys for supplying power fluid to said at least two trolleys.

7. Apparatus according to claim 6, wherein the adjustable supporting means of said trolleys include rollers arranged in pairs to form a saddle for the pipeline length, each roller being supported by a stem mounted on the piston of an hydraulic jack that is operable to control tilting of the pipeline length.

8. Apparatus according to claim 6, wherein the power equipment includes at least two electrowelding sets.

9. Apparatus according to claim 6, wherein the power equipment on said trolleys includes means controlled by hydraulic fluid for providing the pipeline with a protective sheath.

10. Apparatus according to claim 6, wherein the power equipment on at least one of said trolleys includes testing means for testing the welded seams made in the pipeline.

11. Apparatus according to claim 6, wherein the power equipment on at least one of said trolleys includes means for scavenging the excavation before laying the pipeline on the excavation bottom.

* * * * *